Jan. 26, 1954     F. W. VIEHE ET AL     2,667,068
SYSTEM FOR MEASURING THE PRESTRESS OF CONCRETE TANKS
Filed Dec. 3, 1948
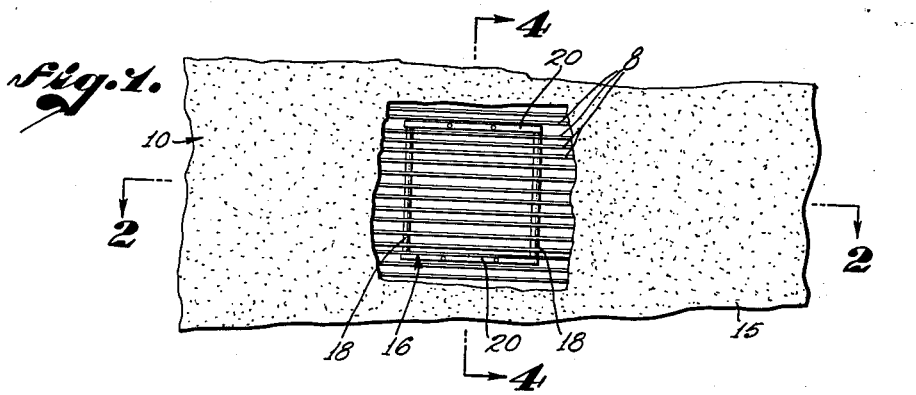
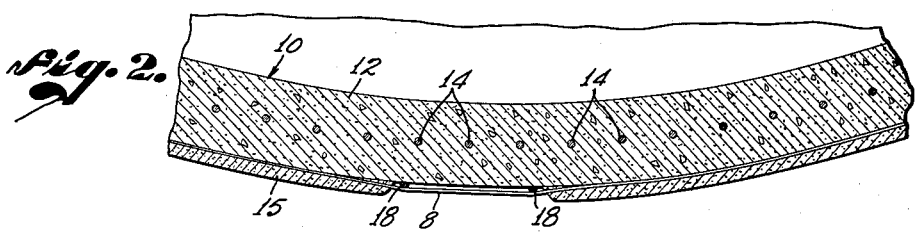
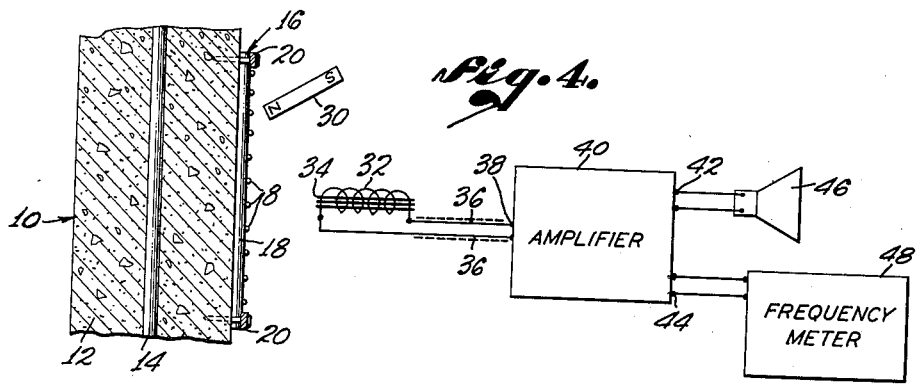
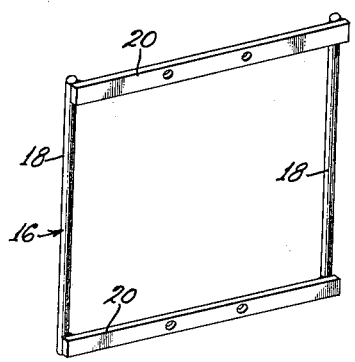
FREDERICK W. VIEHE, &
COURTENAY B. HARRIS,
           INVENTORS.
BY
AGENT.

Patented Jan. 26, 1954

2,667,068

UNITED STATES PATENT OFFICE 2,667,068

SYSTEM FOR MEASURING THE PRESTRESS OF CONCRETE TANKS

Frederick W. Viehe, Los Angeles, and Courtenay B. Harris, Glendale, Calif.

Application December 3, 1948, Serial No. 63,286

9 Claims. (Cl. 73—88)

Our invention relates to improvements in methods of manufacturing and testing structures reinforced by stressed structural members, and more particularly to an improved method and apparatus for measuring the stress in prestressed wires which reinforce concrete tanks. Our invention is especially applicable to the measurement of the stress of prestressed reinforcing wire which is embedded in concrete tanks. For this reason it is described hereinbelow with particular reference thereto. However, it is to be understood that it is applicable to other types of reinforced structures.

In manufacturing reinforced concrete tanks, a concrete tank body, usually of circular cross section, is formed upon a solid base. The tank body is reinforced in a vertical direction by means of vertical rods or bars embedded within the tank body at the time it is formed. Reinforcement in a tangential or circumferential direction is achieved by wrapping wire under tension in a helical configuration about the tank body. Thereafter firm and intimate contact and coherence between the tank and the wire is achieved by applying a coating or layer of cement over the wire such as by a spraying or "gunite" process.

In a widely employed method of wrapping the wire on the tank body, the wire is drawn through a reducing die while being held under tension during the wrapping procedure. The drawing of the wire through the reducing die, heats the wire. When the wire cools subsequently to atmospheric temperature, the tension in the wire may be increased as much as about forty to fifty per cent.

In order to manufacture a tank of high bursting strength and low cost, it is important to prestress the wires to the maximum safe value consistent with their tensile strength. No rapid, accurate, and inexpensive method of measuring the stress of such wires has been available heretofore. The stress to be measured equals the tension per unit cross section of wire.

Prior to our invention the "snap-back" method has been commonly employed for measuring the stress of such prestressed wires in a tank. In this prior method, a trial run is made with the winding machine. During the trial run an attempt is made to maintain the initial tension more or less constant. In order to ascertain the stress existing in the wire after cooling, a length of the cooled wire under tension is measured. Then the tension is relieved and the resultant shrinkage or change in length of the wire is measured. Thereafter the stress which existed in the cooled wire is calculated from the well known formula, $$S=\frac{E\Delta l}{l} \qquad (1)$$

In this equation:

$E=$Young's modulus.
$l=$length of wire after shrinkage.
$\Delta l=$shrinkage.

Where it is desired to know the tension in the cooled wire, the diameter of the wire is measured to determine the cross-sectional area of the wire and the tension calculated from the formula, $$T=SA \qquad (2)$$

where $T=$tension in the wire
and $A=$cross-sectional area of the wire.

Errors in the measurement of the stress by the "snap-back" method arise because of variations in the value of Young's modulus from one wire to another and in the errors in measuring the shrinkage.

After satisfactory tests have been obtained with a trial run, a regular run is made in which the tank body is wrapped with wire from top to bottom under circumstances as nearly similar as possible to those which existed during the trial run. Generally it is thereafter assumed that the tension and stress attained in the wire in the regular run is the same as that obtained in the trial run. Though it would be possible to stop the regular run at intervals and make tests to ascertain the stress of the wire applied by the "snap-back" method, this would interfere so much with the operation that it would make the cost practically prohibitive. When sample tests are occasionally made, as where a large number of tanks are being manufactured, it is often found that the stress in the wire is considerably different from the value to be expected on the basis of the trial run. Because it has not been feasible heretofore to measure the stress in the reinforcing wire applied during the regular run, many reinforced concrete tanks of the type described are manufactured and used without any accurate knowledge of the actual stress existing in the reinforcing wire. Consequently in such cases, there is considerable danger that the reinforcing wire may exceed its tensile strength and break when the tank is subjected to unusually low atmospheric temperatures or when filled with liquid, especially if the tank is tall.

While it is not necessary to an understanding of the present invention, it is important to note that one important source of error in the prestressing of the reinforcing wires lies in the fact that the reduction die wears during use so as to cause unanticipated, or at least unaccounted for, errors in wire cross section and wire heating. Other sources of irregularity in the prestressing of the reinforcing wires are inherent in the mechanical operation of the wrapping machine.

According to our invention, the stress of the reinforcing wires is measured while in place. As a result, our method makes possible the measurement of the stress without interrupting the wrapping operation, and without disturbing the reinforcing wire once it has been wrapped on a tank body.

More particularly, our invention contemplates establishing a pair of spaced, raised portions in the form of frets on the external wall of a tank body and wrapping the wire over the frets. In practice the frets are arranged in coextensive mutually spaced lines parallel to the axis of the tank and they are in sight of each other. Thereafter as the wire is wrapped onto the tank it is wrapped over the two frets in succession, thus bridging the wire over them and establishing a freely suspended test portion therebetween, which for brevity, is often referred to hereinafter as a free portion, or segment. By bridging the wire over the frets while wrapping it onto the tank body under tension, the stress in the free portion is substantially the same as the stress in the adjacent portions of the wire external to the frets and in contact with the tank wall. An arrangement wherein such a wire is bridged over a pair of frets is hereinafter sometimes referred to as a bridge.

Thereafter when the reinforcing wire has cooled, we test the free portion in order to ascertain the stress therein, thus obtaining a measurement of the stress in the adjacent external portions. After the tests have been completed and found to be satisfactory the tank body is coated with cement, thereby embedding the reinforcing wire including the free portion thereof within the tank walls where they fully perform their reinforcing function. In some cases though, the free portions are not coated, thus making it possible to test the tank from time to time while the tank is in use.

The method which we prefer to employ in testing a free portion of the reinforcing wire involves measuring its natural frequency of vibration while in place under tension. This frequency measurement is employed, together with a measurement of the length of the free portion and the density of the wire material in order to calculate the stress. This calculation gives an excellent "first-approximation" to the stress without any need of measuring the radius of the wire or the Young's modulus thereof. However, these factors may be taken into account if desired in more accurate analyses. Even if such corrections are not made, it is ordinarily found that the stress determination obtained by our method is much more accurate and reliable than that obtained in the "snap-back" method.

Our preferred method of determining the natural frequency of vibration of the free portion of the reinforcing wire is to magnetize that portion and to measure the frequency of variation produced in the surrounding magnetic field when the wire is vibrated.

Our invention possesses numerous other features of advantage and may be applied in other ways, as will become apparent from a consideration of the following description of specific apparatus embodying and utilizing our novel method. It is therefore to be understood that our method may be applied to other types of reinforcing members and with the aid of other types of testing apparatus than those specifically disclosed herein. We therefore do not intend to limit ourselves to the specific application of our invention, or to the specific type of testing apparatus described herein as we may adopt various other testing apparatus and apply our invention to the testing of other types of stressed reinforcing members without departing from the true spirit and scope of our invention. It is therefore to be understood that we do not limit ourselves to the specific applications of our invention herein described and illustrated, but that the scope of our invention is best defined by the appended claims.

In the drawings, wherein like characters indicate like elements throughout the several views:

Figure 1 is a fragmentary elevational view showing a bridge installed on a concrete tank body in accordance with our invention;

Figure 2 is a horizontal sectional view taken on the line 2—2 of Figure 1;

Figure 3 is an isometric view of a bridge frame; and

Figure 4 is a schematic diagram of apparatus employed for measuring the stress of reinforcing wire in accordance with our invention.

Referring to the drawing, our invention is illustrated therein in its application to the measurement of the stress present in prestressed reinforcing wire 8 which has been wrapped helically about a tank body 10. In a typical case, the tank comprises a body having a cylindrical wall 12 having a diameter of one hundred and fifteen (115) feet and a radial thickness of about twenty inches. The tank wall is reinforced vertically by means of vertical reinforcing rods 14 spaced about the wall at suitable intervals. The helically wrapped wire 8 serves to reinforce the tank wall in a tangential or circumferential direction, thus resisting radial bursting forces caused by any liquid stored in the tank. After the stress in this wire has been measured by our method the tank body is coated with a layer 15 of cement, so that the wire is embedded within the concrete tank wall.

In order to measure the stress in the wire 8, auxiliary bridge frames 16 are attached to the outer wall of the tank body at suitably spaced intervals thereon as indicated in Figure 4. Each frame 16 comprises a pair of two vertically disposed steel rods or frets 18 preferably of circular cross section interconnected at their ends by two horizontal spacers 20. In a typical installation the two rods 18 may have a diameter of about 0.25'' and they may be separated by a distance of about two feet, thus placing each in line of sight of the other when held against the outer surface of the wall 12 of the tank body 10. The spacers 20 are preferably welded to the outer sides of the two rods 18 and are preferably nailed or otherwise firmly secured to the cement wall so as to position the rods 18 firmly against the wall.

The bridge frames may be installed in echelon or stepped fashion so that each and every turn of wire is bridged on at least one pair of frets.

After the bridge frames 16 have been installed, wire is wrapped around the tank body 10 in the conventional manner hereinbefore explained in which the wire is drawn through a reducing die (not shown) and applied to the wall while the wire is heated and under tension. When the portion of the tank body upon which the frame 16 is mounted is wrapped, the wire is bridged across the two rods 18, firmly supporting the wire at two points and leaving intervening portions, or segments, which are free, that is, spaced from the tank wall. By virtue of the fact that the bridging operation is performed while the wire is under tension, the stress is the same in the free portions of wire bridged between the rods 18 as in the portions of the wire external to the frame 16, including those neighboring external portions which are in contact with the wall. As the wrapping process continues a series of free wire portions are thus bridged on the frame 16. In order to prevent subsequent loosening of the wire if a portion thereof slips off of the frame, precautions are taken during the installation to be certain that the wires do not rest on the upper or lower edges of the frame, but either firmly engage the neighboring portions of the tank wall or the rods 18.

In an actual case, steel wire of a diameter of about 0.161″ has thus been applied to tank walls by drawing it through reducing dies having a diameter of 0.140″. In such an operation it is not unusual for the temperature of the wire when applied to be several hundred degrees higher than the ambient temperature. For this reason when the wire cools, the stress therein increases. In such a case the stress has actually been found to increase from 120,000 p. s. i. to 170,000 p. s. i. as a result of the cooling (1 p. s. i.=1 lb. per square inch).

In order to measure the stress in the wire 8, the free portions thereof are magnetized at points midway between rods 18. Where steel reinforcing wire is employed, the magnetization of the wire is accomplished by touching the free portion lightly with a small permanent magnet 30, as indicated schematically in Figure 4. The magnet is then withdrawn, leaving the free portion of the wire permanently magnetized. If non-magnetic reinforcing wire is employed, a small quantity of powdered magnetic material suspended in glue, solder, or the like, is applied to the free portions of the wire, preferably at the centers thereof, and this powder is then magnetized with the magnet 30. The material chosen for this purpose may be magnetic steel or other metal of high magnetic retentivity. Preferably, the mass of the material so added is so small that it reduces the natural frequency of vibration of the wire only a negligible amount. The mass of added material may be minimized if desired, by metallizing the wire by a spraying process.

In either event, a free portion of the magnetized wire to be tested is then manually plucked lightly, causing it to vibrate. While the wire is vibrating, an induction detector comprising an induction coil, such as the secondary winding of a Ford spark coil 32 having an iron core 34 therein, is brought into the neighborhood of the vibrating wire. The vibration of the wire causes the strength of the magnetic field in the neighborhood of the induction coil 32 to vary, thereby inducing a variable electromotive force therein. This electromotive force is applied by means of conductors 36 to the input 38 of a voltage amplifier 40 having a pair of outputs 42 and 44. To minimize interference from extraneous variable electrostatic fields, the conductors 36 and the induction coil are electrostatically shielded.

A loud speaker 46 or other suitable sound reproducing device, connected to one output 42 serves to reproduce the amplified signals audibly. Two main advantages attend the use of such a sound reproducing device. In the first place it enables the operator to recognize whether or not only a single wire is vibrating; for if accidentally two neighboring wires have been plucked, the two signals induced thereby in the induction coil 32 will generally manifest their presence by a beat-type sound, since the two frequencies of vibrations will generally be slightly different. Another advantage of employing such a loud speaker lies in the fact that it enables the operator to determine by listening whether there is an excessive harmonic content in the vibration of the wire.

A frequency measuring circuit or frequency meter 48 is connected to the other output 44. This meter 48 is of any conventional type which is suitable for measuring accurately the frequency of the electric signal appearing at the output 44 of the amplifier.

The stress existing in a vibrating wire of circular cross section may be calculated from the frequency of vibration by means of the formula, $$f = \frac{s}{2l}\sqrt{\frac{S}{D}\left(1 + \frac{\pi^2 s^2 r^2 E}{8l^2 S}\right)} \qquad (3)$$

where, $f$=frequency (cycles per second)
$s$=harmonic number=1, 2, 3, 4, etc.
$l$=length (cm.)
$S$=stress (dynes/cm.$^2$)
$D$=density (gram/cm.$^3$)
$r$=radius (cm.)
$E$=Young's modulus (dynes/cm.$^2$ per unit elongation)

As a first approximation, the second, or correction, term in parenthesis may ordinarily be neglected, at least if the harmonic number $s$ equals one; that is, especially if the frequency of the fundamental is being measured. A very accurate measurement of the stress is thus obtained.

The accuracy of the stress measurement made by our method is limited only by the accuracy of measuring the length $l$ of the vibrating wire segment, and the density $D$ of the wire material. The length $l$ may be measured accurately. The density $D$ is known to a high degree of accuracy since it is not modified substantially by drawing the wire through the die. To a first approximation it is to be noted that the calculation of the stress does not depend upon the value of Young's modulus $E$, since this factor appears only in the second term in the parenthesis. This is quite unlike the "snap-back" method wherein the accuracy of the stress measurement depends directly upon the accuracy of Young's modulus, as indicated by Equation 1 above. Thus whereas in the "snap-back" method even for a first approximation, it is necessary to know $E$ accurately, and even to measure it for the particular strip of wire under test, this is unnecessary in our method. For in our method, even where Young's modulus is known only approximately, the stress may be calculated to a high degree of accuracy when the second term in the parenthesis of Equation 3 is taken into account.

In an actual case, a 0.161″ diameter steel wire was reduced to a diameter of 0.140″ while being wrapped onto a one hundred and fifteen foot diameter tank, and the length of the free portion was 2.030 feet. When the wire cooled, the fundamental frequency was found to be 326.5 cycles per second. The corresponding stress calculated from Equation 3 was 186,400 p. s. i. neglecting the correction term and 185,900 p. s. i. when taking it into account. Even if the correction term is neglected, the result so obtained is very much more accurate than any obtainable with the "snap-back" method.

Though we prefer to measure the fundamental frequency of vibration (for which $s=1$), because this minimizes the correction term, if the frequency of a higher harmonic (for which $s>1$) is measured, this may be readily taken into account by inclusion of the correction term.

In any event, once the stress has been accurately determined, the tension may be calculated from the wire cross section if that information is desired.

From the foregoing explanation it will now be clear that we have provided an accurate, rapid, convenient, and inexpensive method of testing reinforcing wires to ascertain the stress and tension in them. With our method, tests are actually made on the reinforcing wires which are permanently incorporated in the structure built and used and not merely on wires temporarily installed on the tank body during the trial run. As a result of the use of our method it is therefore possible to ascertain with a high degree of accuracy whether reinforcing wires have been prestressed to the degree required without greatly increasing the cost of construction.

While our invention has been described with particular reference to its application to the measurement of stresses in wires employed to reinforce tanks, it is clear that it is also applicable to the measurement of stresses present in other stressed structural members. Though we have described a tank structure in which all the bridges are embedded in cement, it is to be understood that we may leave some of the bridges exposed so that tests of the wires may be made from time to time while the tank is in use.

Also while our invention has been described with particular reference to a special method of testing a free portion of such a structural member, other methods of testing such members to ascertain the stress therein will now occur to those skilled in the art. In particular, it is to be understood that though we have only illustrated a magnetic induction technique for measuring frequency, an electrostatic induction technique could also be employed. In any event, our method of measuring stress is best carried out by employing a testing device which can measure the vibration frequency with a vibration detector that does not contact the vibrating wire. Many such methods are available besides magnetic and electrostatic induction techniques. Such other methods include, for example, the use of microphones for detecting the sounds produced by the vibrating wire or the use of a system in which part of the vibrating wire is photographed to produce an oscillographic trace and the vibrations recorded in a predetermined time interval are then counted.

Also in particular, while we have described our invention with reference to employing a pair of frets, it is also to be understood that under some circumstances a wire member to be tested may be supported in other ways as long as it is firmly supported at two spaced points.

We therefore wish to say again that our invention is not to be restricted to the particular applications and embodiments thereof specifically illustrated and described therein, but that we intend to cover all such modifications and applications thereof that fall within the scope of the appended claims.

We claim:

1. In the manufacture of a reinforced tank wherein a tank body is constructed and a wire is wrapped thereon under stress, the improvement which comprises establishing a pair of mutually spaced raised portions on the external wall of said tank body, said raised portions being in sight of each other, bridging the wire over said raised portions while wrapping it onto the tank body under tension, whereby a portion of the wire is freely supported between said raised portions, vibrating said portion of the wire while in place, and measuring the frequency of vibration.

2. In the manufacture of a reinforced body having an extended convex surface wherein a wire is applied to said surface under tension, the improvement which comprises establishing a small gap along the convex surface of said body defined by two points in sight of each other, bridging the wire over said points while applying it to said surface under tension, whereby a relatively small portion of the wire is freely supported between said points and a relatively large portion of the wire contacts said surface outside said gap, vibrating said small portion of the wire only while so supported, and measuring the frequency of vibration.

3. In combination with a structure having an extended convex surface, a pair of support points adjacent said surface, said support points being in line of sight of each other and being closely spaced relative to the dimension of said surface along a line extending through said points, a reinforcing wire drawn under tension along said dimension and over said points, said wire being pressed against said points by the tension in said wire to establish a relatively short free portion of said wire, a relatively long portion of said wire lying upon said surface in the area thereof outside said points, a detector responsive to vibration of the free portion of said wire, and means connected to said detector for measuring the frequency of vibration.

4. In combination with a cylindrical body member, a pair of support elements extending along the surface thereof parallel to the axis thereof, said support elements being in line of sight of each other and being closely spaced relative to the circumference of said surface, a reinforcing wire supported under tension about said body member, said wire lying over said support elements and being pressed thereagainst by the tension in said wire to establish a relatively short free portion of said wire and a relatively long portion of said wire lying upon said surface in the area thereof outside said elements, means for vibrating the free portion of said wire while so supported, and means for measuring the frequency of vibration.

5. In combination with a cylindrical body member, a pair of support elements on the surface thereof, said support elements being in line of sight of each other and closely spaced relative to the dimension of said surface along a circumferential line passing through said support elements, a reinforcing wire comprising a plurality of mutually-spaced turns encircling said body member and supported under tension along said surface, at least one of said turns overlapping said support elements, whereby one segment of said wire has its ends bearing against said support elements and is freely supported therebetween and other portions of said wire bear against said body member outside the region between said support elements, and a coating of material bonded to said other portions of said wire but not said freely supported segment thereof, said coating also being bonded to said body member.

6. In combination with a cylindrical body member, a pair of support elements on the surface thereof, said support elements being in line of sight of each other and closely spaced relative to the dimension of said surface along a circumferential line passing through said support elements, a reinforcing wire comprising a plurality of mutually-spaced turns encircling said body member and supported under tension along said surface, a plurality of said turns overlapping said support elements, whereby a plurality of segments of said wire have their ends bearing against said support elements and said segments are freely supported therebetween and other portions of said wire bear against said body member outside the region between said support elements, and a coating of material bonded to said other portions of said wire but not said freely supported segments thereof, said coating also being bonded to said body member.

7. In combination with a convex body member, a pair of support elements on the surface thereof, said support elements being in line of sight of each other and closely spaced relative to the dimension of said surface along a helical-shaped line passing through said support elements, a reinforcing wire supported under tension along said helical-shaped line along said surface, said helical-shaped line overlapping said support elements, at least one segment of said wire having its ends bearing against said support elements and being freely supported therebetween and other portions of said wire bearing against said body member outside the region between said support elements, and a coating of material bonded to said other portions of said wire but not said freely supported segment thereof, said coating also being bonded to said body member.

8. In combination with a convex body member, a pair of elongated support elements on the surface thereof, said support elements being in line of sight of each other and closely spaced relative to the dimension of said surface along a helical-shaped line passing through said support elements, a reinforcing wire supported under tension along said helical-shaped line along said surface, a plurality of sections of said helical-shaped line overlapping said support elements, whereby a plurality of segments of said wire have their ends bearing against said support elements and are freely supported therebetween, other portions of said wire bearing against said body member outside the region between said support elements, and a coating of material bonded to said other portions of said wire but not said freely supported segments thereof, said coating also being bonded to said body member.

9. In combination with a cylindrical body member, a pair of support elements extending along the surface thereof parallel to the axis thereof, said support elements being in line of sight of each other and closely spaced relative to the circumference of said surface, a reinforcing wire supported under tension along a helical-shaped line along said surface, said helical-shaped line axially overlapping said support elements, at least one segment of said wire having its ends bearing against said support elements and being freely supported therebetween and other portions of said wire bearing against said body member outside the region between said support elements, and a coating of material bonded to said other portions of said wire but not said freely supported segment thereof, said coating also being bonded to said body member.

FREDERICK W. VIEHE.
COURTENAY B. HARRIS.

References Cited in the file of this patent

UNITED STATES PATENTS

| Number | Name | Date |
|---|---|---|
| 1,086,295 | Hillman | Feb. 3, 1914 |
| 2,031,057 | Mitchell | Feb. 18, 1936 |
| 2,040,874 | Pack | May 19, 1936 |
| 2,185,749 | Kennedy | Jan. 2, 1940 |
| 2,265,786 | White | Dec. 9, 1941 |

OTHER REFERENCES

"Two-Way Prestressed Concrete Water Storage Tank," by J. Roland Carr. Pages 108–113, Engineering News-Record, October 4, 1935.